Figure 1:
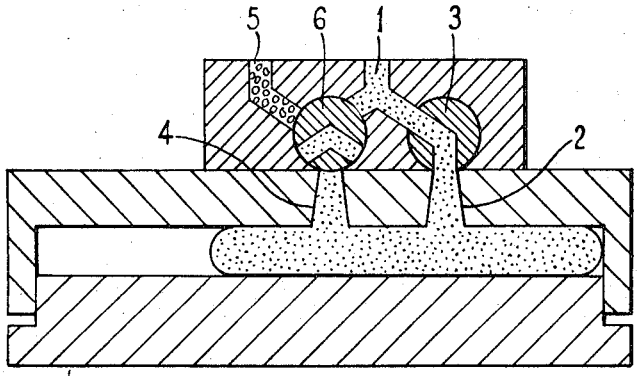
Figure 2:
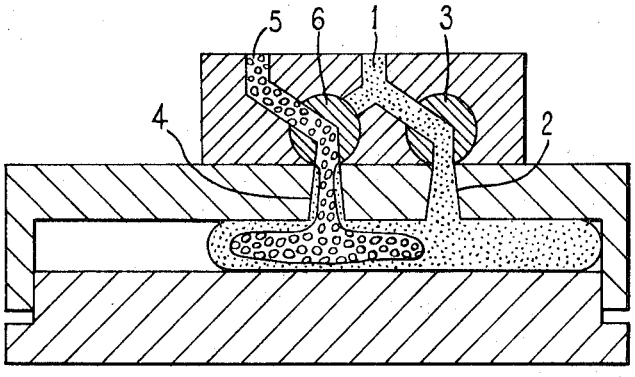
Figure 3:
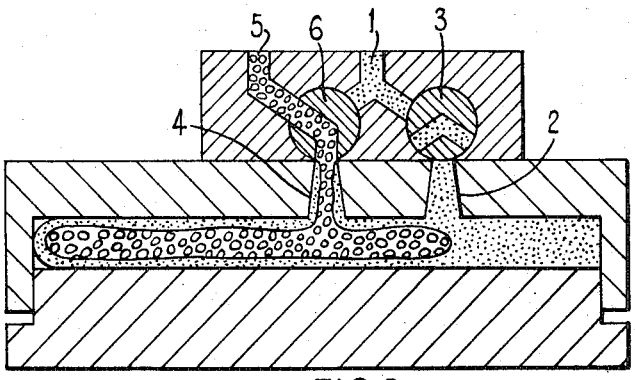
Figure 4:
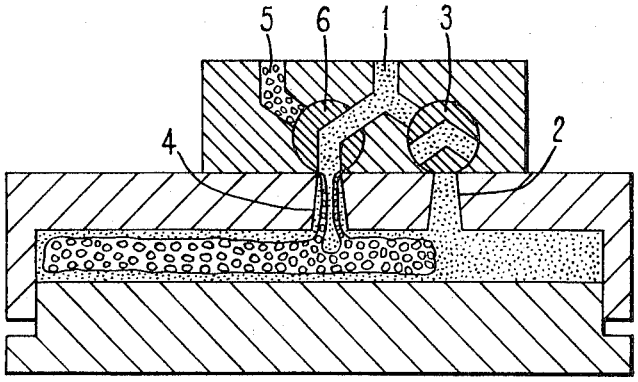
Figure 5:
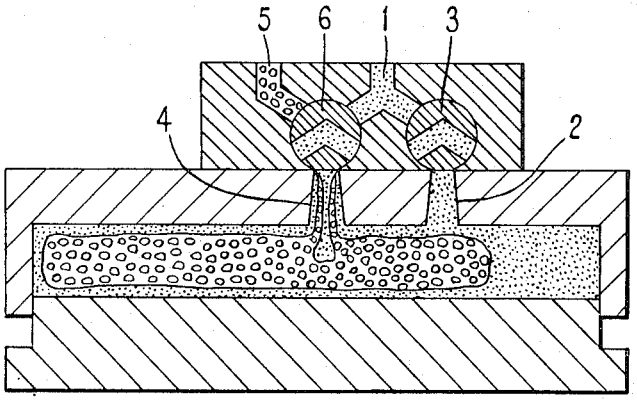
Figure 6:
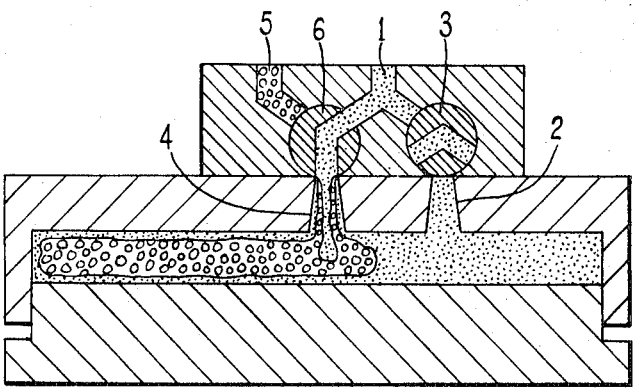

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 7, 1972

904 O.G. 7

T904,007

PRODUCTION OF LAMINAR ARTICLES

Paul Johnson Garner, Thorpe Bay, England, assignor to Imperial Chemical Industries Limited, London, England

Filed Nov. 26, 1971, Ser. No. 202,459
Claims priority, application Great Britain, Nov. 30, 1970, 56,695/70
Int. Cl. B29d *27/00*
U.S. Cl. 264—45
2 Sheets Drawing. 31 Pages Specification

A process in which a skin and core materials are sequentially injected into a mould cavity, wherein skin material is injected through a first sprue channel and core material and also, optionally, skin material, is injected through one or more sprue channels displaced from the first, the amount of skin material injected through the first sprue channel being insufficient to fill the mould cavity and the total amount of skin material injected being in an excess of that required in the final moulding so that subsequent injection of core and/or skin material forces said excess back through a sprue channel through which only skin material was injected. This enables the distribution of skin material relative to core material in the moulding to be modified.

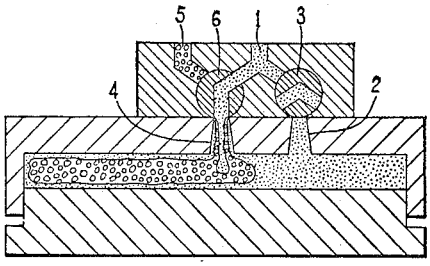

PRODUCTION OF LAMINAR ARTICLES

Filed Nov. 26, 1971 2 Sheets-Sheet 1